Oct. 6, 1953   R. E. COLES   2,654,293
ROTARY BROACH

Filed March 3, 1949   3 Sheets-Sheet 1

INVENTOR.
ROGER E. COLES
BY Robert S. Dunham
ATTORNEY.

Oct. 6, 1953

R. E. COLES 2,654,293

ROTARY BROACH

Filed March 3, 1949

INVENTOR.
ROGER E. COLES
BY
Robert S. Dunham
ATTORNEY.

Oct. 6, 1953 R. E. COLES 2,654,293
ROTARY BROACH

Filed March 3, 1949 3 Sheets-Sheet 3

INVENTOR.
ROGER E. COLES
BY Robert S. Dunham
ATTORNEY.

Patented Oct. 6, 1953

2,654,293

UNITED STATES PATENT OFFICE 2,654,293

ROTARY BROACH

Roger E. Coles, Union, N. Y., assignor to International Business Machines Corporation, New York, N. Y., a corporation of New York Application March 3, 1949, Serial No. 79,334

7 Claims. (Cl. 90—33)

This invention relates to a metal working device. More particularly the invention relates to a power operated rotary broach.

It is an object of the invention to provide a rotary metal working device, whereof substantially the entire operative motion may be applied to the performance of useful work.

It is a further object of the invention to provide a metal working device of the broach variety capable of producing improved results on a piece of metal stock under treatment.

It is a further object of the invention to provide a rotary broach capable of more rapidly performing broaching operations of an exceptionally high quality.

A specific object of the invention resides in the provision of a metal working device of the general category indicated, which is adapted to be used with and actuated by conventional metal working machines generally used in metal working or fabricating plants.

In the broaching of metal, the broaching cutter is usually disposed within a metal working machine either for horizontal or vertical reciprocation in contact with a fixed work piece. In an operative cycle of such machines the metal stock is planed or broached during the forward reciprocation of the cutter and during the return stroke in the latter half of the cycle the broach is merely returned to its original position without operative effect on the work piece. It is, therefore, evident that in the conventional broaching machine the broaching cutter is capable of performing useful work during one-half of an operative cycle only. One of the objectives of the invention herein is attained by providing a rotary broach which eliminates the need for restoring the cutter to an original or starting position, and thereby reduce the time during which the cutter is in non-broaching movement.

A substantial number of tests have shown that the rotary broach herein is capable of producing finished surfaces of an exceptionally high quality. Surface quality is generally defined as a degree of roughness in a machined or finished surface. It is expressed as a number over V, which represents the root mean square average of surface roughness expressed in microinches. A reciprocating broach generally maintains a surface quality of $$\frac{32}{V}$$

In sharp contrast thereto, the rotary broach herein is capable of consistently maintaining a surface quality of $$\frac{16}{V}$$

or better, and with special handling a quality of $$\frac{8}{V}$$

can be achieved. In order to appreciate the value of a broach capable of producing an $$\frac{8}{V}$$

surface finish, other methods and operations required to produce an $$\frac{8}{V}$$

finish may be briefly mentioned for purpose of comparison. A grinding machine, for example, will maintain a $$\frac{16}{V}$$

finish or better. In order to produce an $$\frac{8}{V}$$

finish of a ground part, it is necessary to further process such part by a slow lapping or superfinishing operation.

One of the merits of the present invention is the speed by which the broach is capable of performing the exceptionally fine broaching operations. The broach herein is capable of producing 750 parts in a unit of time, as compared to 125 parts produced in the same time by grinding operations. Furthermore, if ground parts must be lapped, the ratio is even greater, since only approximately 25 parts can be produced in the same period of time if resort is had to a lapping operation.

The production speed of the broaching device herein is further underlined by a comparison thereof to the production speed of milling operations. A five-to-one ratio in production has been maintained in favor of the rotary broach over a milling machine. Furthermore, the broach herein has been found capable of maintaining a three-to-one advantage over a conventional broach, while at the same time producing a greatly superior surface quality.

Further objects and advantages of the device and the manner in which they are achieved will appear from a reading of the following specification with reference to the drawing forming a part hereof, and in which drawing.

Figure 1:
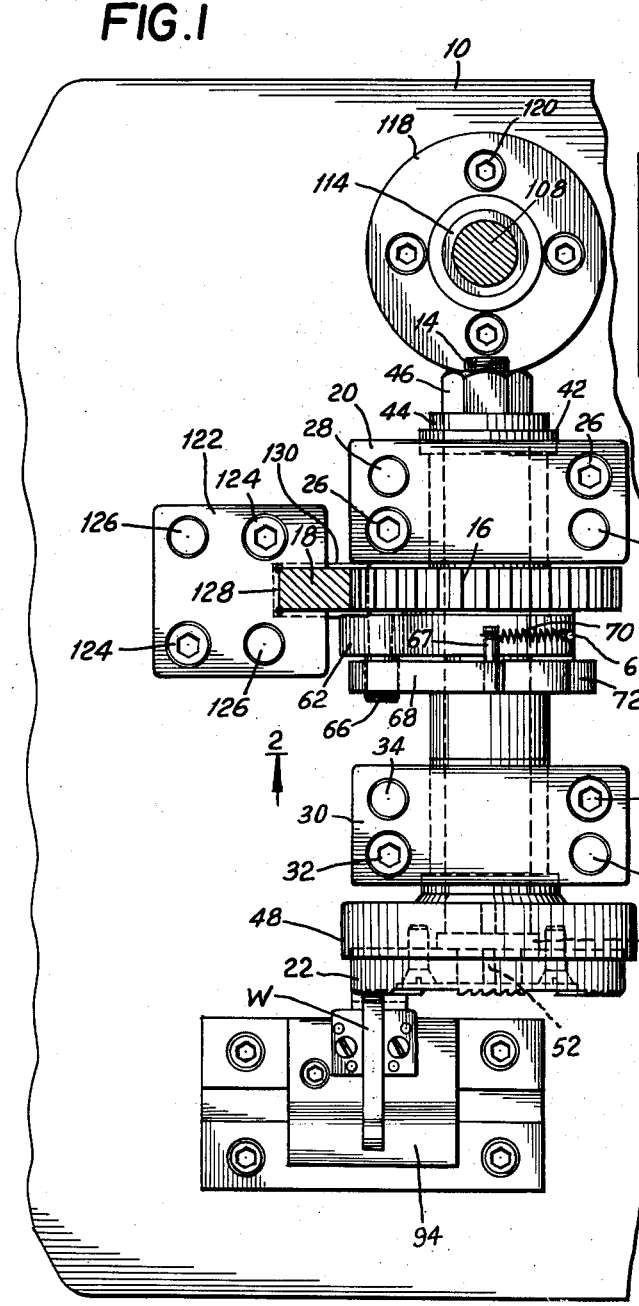
Fig. 1 is a plan view of the rotary broach.
Figure 2:
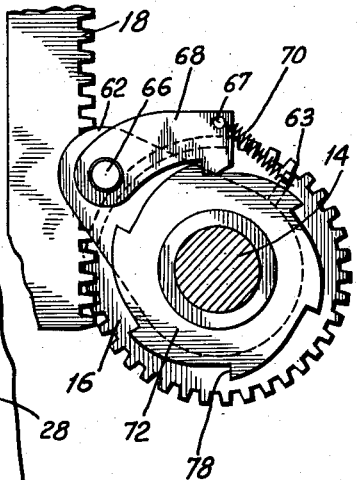
Fig. 2 is a detailed cross-sectional view taken on line 2—2 of Fig. 1.

In general, the metal working device in its operative environment includes a base plate 10, a superimposed headplate 12, which is mounted for reciprocation toward and away from the base plate. The device includes a shaft 14 rotatably mounted on the base plate 10, a pinion 16 mounted on the shaft 14, means 18 for driving the pinion, a one-way drive mechanism 20 fixed to the shaft 14 for transmitting rotary motion from the pinion 16 to the cutter shaft, and a cutter 22 fixed for rotation with the shaft 14 and having a plurality of similar metal working faces disposed in spaced relation to each other on a face thereof.

In its specific aspect, as illustrated in the drawings for purpose of this disclosure, the device is adapted for use in connection with a punch press. It may be assumed, therefore, that the base 10 represents the die set of a press and the crosshead 12 represents the upper or movable block of a blanking die which is adapted to be mounted in a press for reciprocation by a ram (not shown).

One end of the cutter shaft 14 is suitably mounted for rotation on the base 10 by means of a bearing block 24 fixed to the base by means of screws 26 and dowel pins 28. The opposite end of the shaft is mounted in a bearing block 30, which is fixed to the base plate 10 in any suitable manner, as by screws 32 and dowel pins 34. The forward end of the shaft is provided with a flanged portion 36 and a keyway 38, into which is pressed a key 40 for mounting a broach holder. In order to inhibit the shaft 14 against shifting axial motion, a bearing collar 42 is disposed within the bearing block 24 and is provided with a face, against which a washer 44 is held by a lock nut 46 engaged with a threaded end portion of the shaft 14.

The forward end of the cutter shaft has mounted thereon and fixed thereto a broach holder 48, into the socketed face of which is fitted the rotary broaching cutter tool 22. The cutter has provided an internal keyway 50, by means of which the cutter is removably positioned by a key pin 52 carried by the cutter shaft 14. The cutter is further secured to its holder 48 by means of screws 54.

The cutter shaft is adapted for rotation by a power device. Specifically, rotation of the shaft is produced by reciprocation of the drive member 18, which is shown herein as consisting of a rack, the teeth of which are in operative contact with the teeth of the pinion 16. The rack includes a base 56, which is attached to the crosshead 12 by means of screws 58 and dowl pins 60.

The pinion 16 is mounted on the shaft 14 for rotation with respect thereto. It is essential, therefore, that a clutch device be provided between the pinion 16 and the shaft, so that rotary motion may be transmitted from the pinion to the shaft. This function is performed by the one-way drive or connecting device 20, which includes a drive cam 62 mounted freely on the cutter shaft, but connected to the pinion 16 for rotation therewith by means of a forwardly extending drive pin 64. The cam has provided in a face thereof a forwardly extending stud shaft 66, having thereon a rotatably mounted pawl 68, which is urged by a spring 70 into cooperation with a ratchet wheel 72 rigidly attached to the cutter shaft 14. The spring 70 has one end thereof anchored on a stud 67 fixed to and extending from a face of the pawl 68, and the other end thereof on a stud 63 fixed to and extending outwardly from the cam 62.

It follows, therefore, that rotation of the pinion 16 will cause rotation of the cam 62 and consequent angular movement of the pawl 68, the free end of which is in operative contact with the cutter shaft driving ratchet 72. Upward reciprocation of the rack 18 simply causes the pinion 16 to rotate idly on the cutter shaft, but during such rotation the cam 62 and its associated pawl 68 are returned to their original position and the drive mechanism is, therefore, conditioned for operative rotation of the cutter shaft.

Figure 5:
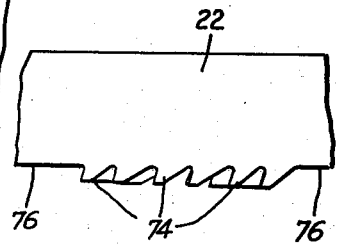
Fig. 5 is a fragmentary enlarged view of a cutter showing the disposition of cutting teeth on a face thereof.

It is to be noted herein that the cutter 22 has provided on a face thereof a plurality of grouped cutter teeth 74, each group constituting a separate and independent broaching unit. In particular, the grouped cutter teeth are provided on the forwardly disposed radial face of the cutter and constitute thereon a series of working or broaching faces. The teeth of each group are stepped in increasing height from one end to the other, as more particularly shown in Fig. 5 of the drawing, so that successive higher teeth of a group each shave a minute layer of metal from a work piece under treatment. The number of working faces on the radial face of the cutter tool is optional, but the number is related to the degree of rotation imparted to the cutter shaft during each reciprocation of the crosshead 12. In the example shown, it may be assumed that six independent cutting faces have been provided on the cutting tool in equally spaced relation to each other, thereby providing a circumferential dwell 76 between each of the groups. Accordingly, in order to move any given group of teeth through a work station, it is necessary, in the example given, to rotate the cutter shaft 14 through 60 degrees. Because of this relationship, therefore, the ratchet wheel 72 has been provided with six equally spaced teeth 78, and the reciprocation of the rack 18 and consequent rotation of the pinion 16 are such as to advance the ratchet wheel 72 through the distance of a single tooth, which produces, in the example given, a cutter shaft rotation of 60 degrees. It will be apparent, however, that a greater or smaller number of working faces may be provided on the cutter and that the driving mechanism can be rearranged easily to impart to the cutter shaft the necessary rotational movement to drive a single set of broaching teeth through the work station.

It is desirable that rotation of the cutter be controlled to the extent that its movement be arrested promptly after the last cutter tooth of a series has passed through the work station. For the purpose of positively arresting the movement of the cutter after the drive mechanism has operated to rotate a set of cutting teeth through the work station, there is provided, therefore, a positive detent device for performing this function. The forwardly disposed bearing block 30 has positioned therein a spring pressed detent 80. The detent operates in a forwardly opening passage 82 within the bearing block, and it includes a head 84, which is adapted to abut a shoulder formed by the rearwardly disposed enlargement 86 of the passage 82. Abutment of the head 84 against the shoulder limits the forward movement of the detent, and the same is urged forwardly by means of a compression spring 88 bearing against the head 84 at its forward end and at its other end against a screw 90, which forms a closure for the rearwardly disposed enlarged mouth of the passage 82. The forwardly projecting end of the detent 80 is adapted to engage in successive order shallow recesses 92 formed at regularly spaced points about the rear face of the cutter holder 48. The depressions 92 are so located with respect to the working faces of the tool that the rotation of the device is arrested by engagement of the detent with a recess immediately upon passage of the last tooth of a working group through the work station.

The stock or work pieces W, upon which broaching operations are to be performed, may be positioned with reference to the cutter 22 by locating the same on a work holder or anvil 94, and when so positioned the dwells 76 between the respective spaced working faces of the broaching tool constitute work locating surfaces, against which the stock or work piece may be projected for properly positioning the same at the beginning of a broaching operation.

It is an object of the invention to provide a convenient work holding clamp, which is automatically operable with the reciprocation of the crosshead 12. Herein the clamping or holding means consists of a fluid pressure cylinder 96 attached by means of screws 98 to the crosshead 12. Fluid under constant pressure is admitted to the cylinder 96 from a suitable source by way of a fluid pressure conduit 100. Disposed for reciprocation within the cylinder 96 and extending downwardly therefrom is a piston-like plunger 102, which is adapted to engage a work piece disposed on the support or anvil 94. The lower end of the cylinder 96 is sealed by a threaded plug 104, which is engaged with the internally threaded lower portion of the cylinder. The plug 104 has a piston passage therein and serves as an abutment for an enlarged head 106 on the end of the piston disposed within the cylinder 96.

In order to maintain a fixed timing relation between the rack 18 and the broaching cutter pinion 16, a means is provided to prevent the upper crosshead 12 from being separated from the die assembly during handling thereof. Herein the means specifically consists in a plunger 108 having a flanged upper end 110 adapted to be fixed to the crosshead 12 by means of screws 112. The plunger 108 is disposed for reciprocation in an aligned cylinder-like base 114, which has a pair of diametrically disposed elongated slots 116 in the side walls thereof. The base 114 has an attaching flange 118 at one end thereof, by means of which it may be attached to the base plate 10 through the instrumentality of screws 120. Extending laterally in opposite directions from the free end of the plunger 108 are a pair of limit studs 122, which extend through and operate in the elongated slot 116, thereby serving as limit devices in contact with the upper end of the slots 116.

Figure 3:
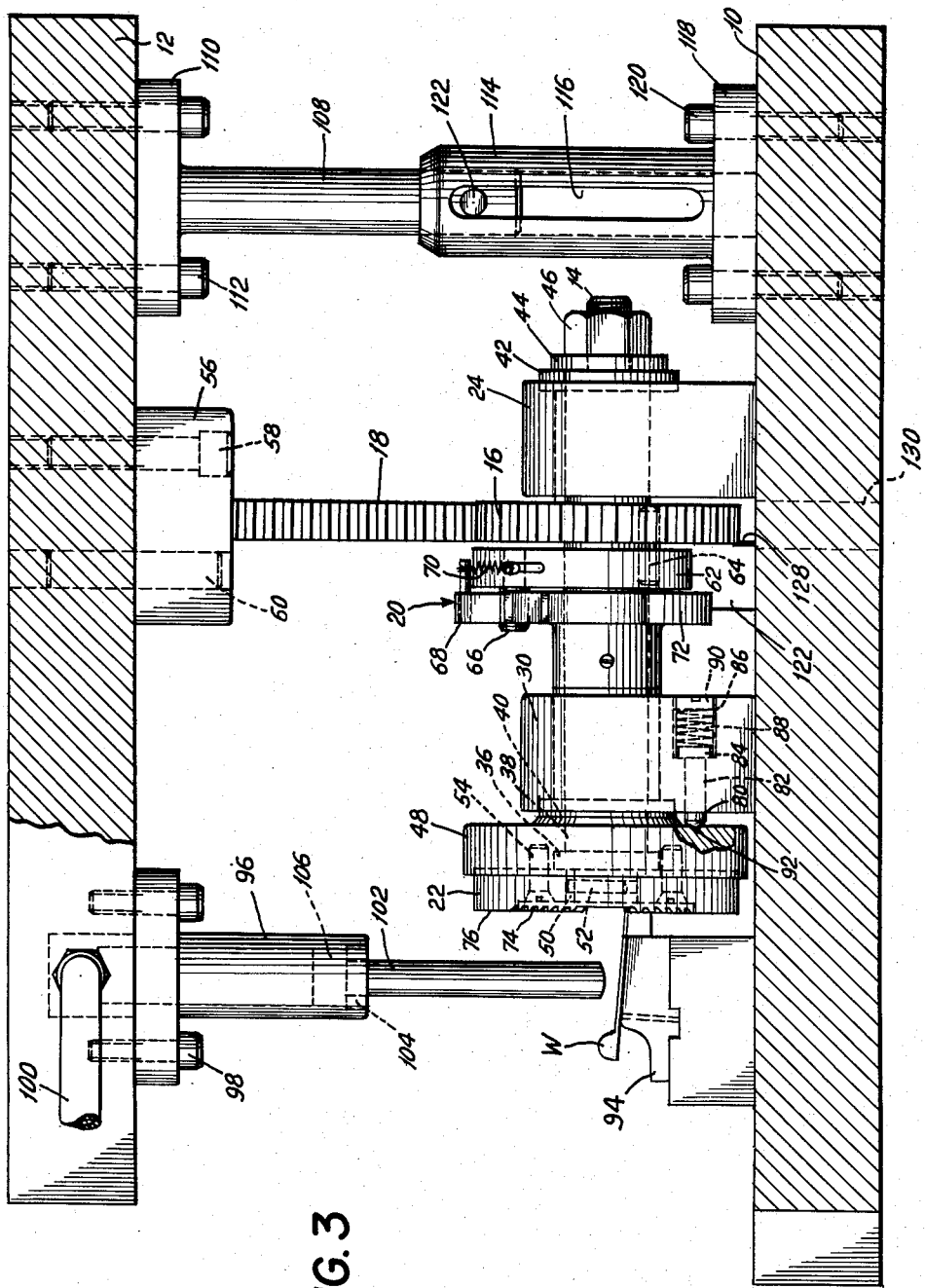
Fig. 3 is an elevational view taken from the side of the broach.
Figure 4:
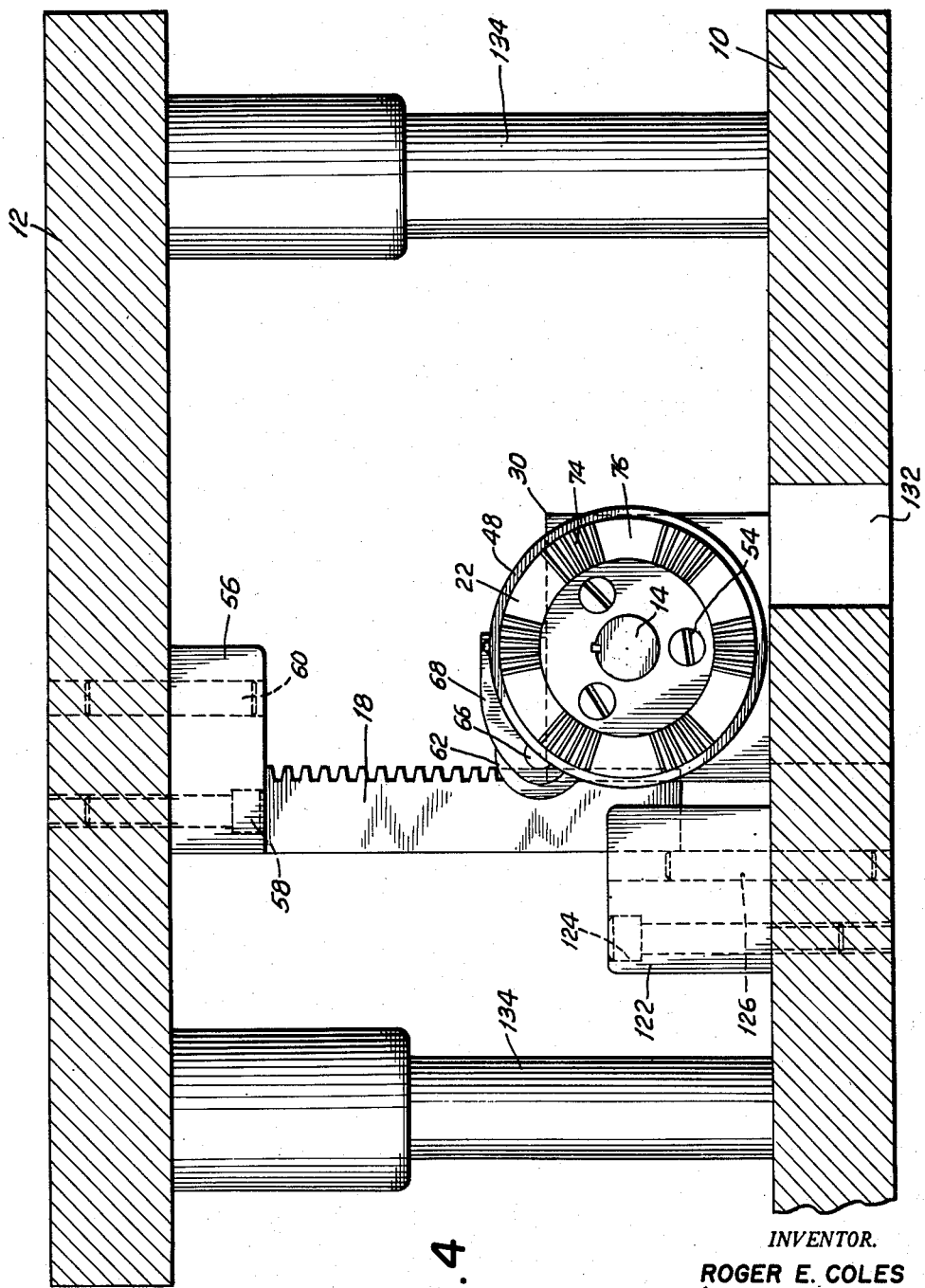
Fig. 4 is an elevational view looking toward the face of the broaching cutter.

The rack 18 is guided in its reciprocatory motion by a guide block 122 attached to the base 10 by means of screws 124 and dowel pins 126. The guide block has an open guide slot 128 extending through a face thereof, beyond which extend the teeth of the rack 18. The walls of the slot embrace the rack 18 and guide the same in its movement. The base plate 10 has an aperture 130 in the path of movement of the rack 18, thereby providing clearance for the reciprocation thereof. The bed plate 10 is also relieved or has provided therein an aperture 132 for receiving or discharging therethrough the shavings resulting from operation of the broaching tool. The telescopic guide rods 134 in Fig. 4 of the drawing are conventional in blanking press structures and are, therefore, not shown in Figs. 1 and 3 of the drawing in order to more clearly show the essential structure of the invention herein.

The device has been illustrated herein in a single form, which is deemed sufficient to teach the principles involved in its operation, and it follows, therefore, that changes and modifications may be made in the structure without departing from the spirit of the invention.

What is claimed is the following:

1. In a metal working device, a base, a shaft rotatably mounted on said base, a work station, a metal working tool fixed to said shaft, a plurality of similar metal working faces disposed on the face of said tool in spaced relation to each other, and means operative upon each actuation thereof for imparting a partial revolution to said shaft to drive a single one of said faces through said work station.

2. In a metal working device, a base, a shaft rotatably mounted on said base, a work station, a metal working tool fixed to said shaft, a plurality of similar metal working faces disposed on the face of said tool in spaced relation to each other, a drive means operative upon each actuation thereof for imparting a partial revolution to said shaft to drive a single one of said faces through said work station, and a detent for arresting the revolution of said tool following each operation of said drive means.

3. In a metal working device, a base, a shaft rotatably mounted on said base, a work station, a metal working wheel having a plurality of spaced similar metal working surfaces on a radial face thereof fixed to one end of said shaft, means for imparting a partial revolution to said shaft to drive a single one of said surfaces through said work station, and means for arresting the rotation of said shaft following each operation of said first named means.

4. In a metal working device, a base, a shaft rotatably mounted on said base, a metal working tool fixed to said shaft, a pinion rotatably mounted on said shaft, a reciprocal rack operably disposed with respect to said pinion, means for reciprocating said rack, a one way clutch connecting said shaft and said pinion for imparting unidirectional rotation from said pinion to said shaft upon reciprocation of said rack in one direction, and a detent for arresting the rotation of said shaft following operation each of said rack and pinion and during reciprocation of said rack while moving in the other direction.

5. In a metal working device, a base, a shaft rotatably mounted on said base, a metal working tool fixed to said shaft, a pinion rotatably mounted on said shaft, a reciprocal rack operably disposed with respect to said pinion, a ratchet fixed to said shaft, a pawl carried by said pinion and extending into operative contact with said ratchet for driving the latter in one direction, and means for arresting the rotation of said shaft following operation of said first named means.

6. In a metal working device, a base plate, a superimposed headplate mounted for reciprocation toward and away from said base plate, a shaft rotatably mounted on said base plate, a pinion mounted on said shaft, means connecting said pinion and said shaft for driving said shaft in one direction, a rack mounted on said headplate in driving relation to said pinion, and a metal working tool fixed for rotation with said shaft.

7. In a metal working device, a base plate, a superimposed headplate mounted for reciprocation toward and away from said base plate, a shaft rotatably mounted on said base plate, a pinion mounted on said shaft, means connecting said pinion and said shaft for driving said shaft in one direction, a rack mounted on said headplate in driving relation to said pinion, a metal working tool fixed for rotation with said shaft, a work support on said base plate in proximity to said tool, and a work clamp under a constant fluid pressure mounted on said headplate in alignment with said support.

ROGER E. COLES.

References Cited in the file of this patent

UNITED STATES PATENTS

| Number | Name | Date |
|---|---|---|
| 1,376,734 | Simpson | May 3, 1921 |
| 1,528,800 | Thannhauser | Mar. 10, 1925 |
| 2,106,212 | Halborg | Jan. 25, 1938 |
| 2,113,554 | Johnson | Apr. 5, 1938 |
| 2,480,499 | Marberg et al. | Aug. 30, 1949 |